United States Patent
Giussi et al.

(10) Patent No.: US 11,845,858 B2
(45) Date of Patent: Dec. 19, 2023

(54) FRICTION REDUCING COPOLYMERS AND METHOD OF PREPARATION THEREOF

(71) Applicant: YPF TECNOLOGÍA S.A., Ciudad Autónoma de Buenos Aires (AR)

(72) Inventors: Juan Martín Giussi, Ituzaingó (AR); Lila Arias, Ciudad Autónoma de Buenos Aires (AR); Roque Carlos Dietrich, La Plata (AR); Isabel Vega, Ciudad Autónoma de Buenos Aires (AR); Sofía Rivelli, Ciudad Autónoma de Buenos Aires (AR); Juan Manuel Padró, La Plata (AR); Frederico Irou Roschzttardtz, La Plata (AR); Gabriel Lombardo, Ituzaingó (AR); Paula Cecilia Dos Santos Claro, Villa Elisa (AR)

(73) Assignee: YPF TECNOLOGIA S.A., Ciudad Autonoma de Buenos Aires (AR)

( * ) Notice: Subject to any disclaimer, the term of this patent is extended or adjusted under 35 U.S.C. 154(b) by 0 days.

(21) Appl. No.: 17/548,149

(22) Filed: Dec. 10, 2021

(65) Prior Publication Data

US 2022/0186018 A1 Jun. 16, 2022

Related U.S. Application Data

(60) Provisional application No. 63/124,420, filed on Dec. 11, 2020.

(51) Int. Cl.
*C08L 33/26* (2006.01)
*C09K 8/62* (2006.01)
*C08L 33/02* (2006.01)

(52) U.S. Cl.
CPC .............. *C08L 33/02* (2013.01); *C09K 8/62* (2013.01); *C09K 2208/28* (2013.01)

(58) Field of Classification Search
None
See application file for complete search history.

(56) References Cited

U.S. PATENT DOCUMENTS

| | | | | |
|---|---|---|---|---|
| 2009/0105097 A1* | 4/2009 | Abad | | C09K 8/68 |
| | | | | 507/241 |
| 2011/0174492 A1* | 7/2011 | Robb | | C09K 8/885 |
| | | | | 166/308.2 |
| 2014/0051620 A1* | 2/2014 | Soane | | C09K 8/64 |
| | | | | 252/60 |
| 2021/0371729 A1* | 12/2021 | Li | | C09K 8/88 |
| 2022/0363983 A1* | 11/2022 | Hodgen | | C10M 173/00 |

OTHER PUBLICATIONS

Haiyan Zhao et al., "Viscous Slickwater as Enabler for Improved Hydraulic Fracturing Design in Unconventional Reservoirs", Society of Petroleum Engineers, SPE Annual Technical Conference and Exhibition, Dallas, TX Sep. 24-26, 2018, pp. 1-13.

Mohammad Ba Geri et al., "A Critical Review of Using High Viscosity Friction Reducers as Fracturing Fluids for Hydraulic Fracturing Applications", Society of Petroleum Engineers, SPE Oklahoma City Oil and Gas Symposium, Oklahoma City, OK, Apr. 9-10, 2019, pp. 1-16.

Mark Van Domelen et al., "Applications of Viscosity-Building Friction Reducers as Fracturing Fluids", Society of Petroleum Engineers, SPE Oklahoma City Oil and Gas Symposium, Oklahoma City, OK, Mar. 27-31, 2017, pp. 1-13.

Monet Motiee et al., "High Concentration Polyacrylamide-Based Friction Reducer Used as a Direct Substitute for Guar-Based Borate Crosslinked Fluid in Fracturing Operations", Society of Petroleum Engineers, SPE Hydraulic Fracturing Technology Conference, Woodlands, TX, Feb. 9-11, 2016, pp. 1-11.

* cited by examiner

*Primary Examiner* — John J Figueroa
(74) *Attorney, Agent, or Firm* — MUNCY, GEISSLER, OLDS & LOWE, P.C.

(57) ABSTRACT

A friction reducer comprising a copolymer of acrylamide, an anionic monomer, a zwitterionic monomer or a cationic monomer, a physical ligand or a chemical ligand, wherein the acrylamide amounts to at least 50% (w/w) of the total monomer content. The friction reducer is useful in hydraulic fracturing operations and is obtained by controlled radical polymerization at a temperature between 30° C. and 70° C. using iodine as polymerization control agent.

8 Claims, No Drawings

FRICTION REDUCING COPOLYMERS AND METHOD OF PREPARATION THEREOF

CROSS REFERENCE TO RELATED APPLICATIONS

This application claims priority of U.S. Provisional Application No. 63/124,420 filed on Dec. 11, 2020 under 35 U.S.C. § 119(e), the entire contents of all of which are hereby incorporated by reference.

TECHNICAL FIELD

The present invention generally relates to the field of substances for use in the oil industry. Specifically, the present invention relates to polymers for use as friction reducing agents in hydraulic fracturing and methods of preparation thereof.

BACKGROUND

Unconventional oil and gas reservoirs comprising ultra-low permeability rocks with high hydrocarbon content are developed by means of hydraulic fracturing treatments. In these treatments, a slurry consisting of about 95% water, 4.5% proppant material and less than 1% additives is pumped at high pressures into a rock formation.

During hydraulic fracturing, first a fluid is injected at high pressure into a wellbore causing fractures to open around it. Secondly, a proppant material, such as sand, is included in the fracturing fluid and delivered into the fracture. The proppant material will keep the fracture opened once the treatment is complete.

Fracturing fluids need to meet various requirements: provide pipe friction reduction during the treatment, ensure proppant placement into the fracture, it must be prepared and operated easily on the field, minimize proppant pack damage when the treatment is finished, among others. These requirements are achieved with less than 1% polymer additives incorporated to the slurry.

In the process of pumping, substantial fluid friction pressure or drag is observed between the treatment fluid and the tubing or casing as the fluid reaches turbulent flow, thus causing substantial energy loss. As a result of the energy loss, a higher pumping pressure is needed to achieve the desired flow rate and the pressure needed to fracture the rock formation. Friction-reducing polymers included in the fluid suppress the turbulence and allow to reach higher fluid flow rate at a fixed pumping pressure.

During the proppant placement phase of the treatment, fracturing fluid acts a carrier for the proppant agent particles. The fluid must thus be capable of suspending large concentrations of particles for long transport distances. The suspending properties of the fluid are related to its viscosity and higher viscosities are need for transporting higher proppant concentrations. Proppant settling from fracturing fluids within the horizontal section of the wellbore is a concern. Excessive proppant settling within horizontal wellbore may cause an early and undesirable pumping ending up. Typically, settling occurs as a result of insufficient slurry flow velocity and/or insufficient viscosity to suspend the proppant.

In recent years, the oil & gas industry has adopted the use of High Viscosity Friction Reducers (HVFR) polymers in fracturing fluids due to several operational and economic reasons that are widely described in previous works (Ba Geri et al. 2019; Van Domelen et al. 2017; Motiee et al. 2016; Zhao et al 2018). These polymers have both good drag reduction capability and high viscosity to carry proppant into the fracture. However, these compounds display limited friction reduction properties in high salinity media, and particularly in the presence of divalent cations. In addition, HVFRs are generally obtained using costly and non-environmentally friendly methods of preparation, based on oil/water emulsion free radical polymerization methods.

A considerable variety of polymer additives have been proposed for the use in hydraulic fracturing operations. Several studies have been conducted around copolymers and terpolymers as friction reduction agents. These polymers are obtained using bulk free-radical polymerization and/or oil/water emulsion polymerization methods. These two pathways have not shown good quantitative monomer conversion, in addition to being detrimental to the environment. Moreover, organic solvents used in emulsion polymerization can be an environmental hazard. Most of these available additives have a limited tolerance to highly saline media, that is why the use of freshwater for hydraulic fracturing operations is needed.

There is therefore a need to provide a polymer acting as friction reduction agent, which can maintain an improved viscosity in highly saline media, particularly in the presence of divalent cations.

SUMMARY

The present invention provides HVFRs polymers with high tolerance to salt and high friction reduction properties. The polymer is obtained using an economical and controlled method in aqueous media, involving a synergistic combination of strategically selected monomers and without significant quantities of residual monomer.

The polymers provided by the invention comprises polyacrylamide (PAM), as well zwitterionic, cationic, and anionic entities or combinations thereof, entities providing resistance to highly saline media and/or physical and chemical ligands or combinations thereof, which improved good viscoelastic and friction reduction properties.

The combination of PAM with zwitterionic, anionic/cationic monomers and physical and/or chemical ligands provides additives that exhibit competitive performances as well as high resistance to salt. In addition, the methods of preparation are strategic and provide the additives in an aqueous solution or in a water/water emulsion having a quicker dissolution, easy storage and transport, and competitive costs.

The additive can be dried after the polymerization or can be directly applied.

Therefore, a first object provided by the invention is a friction reducer comprising a copolymer of acrylamide, such as a ter-polymer or a tetra-polymer of acrylamide with zwitterionic and/or cationic and/or anionic entities and/or physical and/or chemical ligands, wherein the acrylamide amounts to at least 50% (w/w) of the total monomer content.

In a preferred embodiment, a residual acrylamide content is lower than 500 ppm, preferably lower than 20 ppm.

Preferably, the anionic monomer is selected from acrylic acid, 2-acrylamido-2-methyl-1-propanesulfonic acid, and 3-sulfopropyl methacrylate potassium salts.

Preferably, the zwitterionic monomer is [2-(methacryloyloxy) ethyl] dimethyl-(3-sulfopropyl) ammonium hydroxide. Preferably, the cationic monomer is 2-(methacryloyloxy)ethyl] trimethyl-ammonium chloride or (3-acrylamidopropyl) trimethylammonium chloride.

Preferably, the physical ligand is selected from hexyl acrylate, 2-ethylhexyl acrylate, lauryl acrylate and N-alkyl acrylamides.

Preferably, the chemical ligand is selected from N,N'-methylenebisacrylamide and ethylene glycol diacrylate.

The present invention further provides a method to prepare a friction reducer comprising carrying out a controlled radical polymerization process of a monomer mixture of acrylamide, an anionic monomer, a zwitterionic monomer or a cationic monomer, and physical and/or chemical ligands, wherein the acrylamide amounts to at least 50% (w/w) of the total monomer content, at a temperature between 30° C. and 70° C. using iodine as polymerization control agent, persulfate salts (e.g. sodium, potassium or ammonium persulfates) as initiators and N,N,N',N'-tetramethylethylenediamine and/or metabisulfite salts and/or iron II salts as catalysts.

DETAILED DESCRIPTION

The precursors for the polymers provided by the present invention comprise monomers from which the polymer is obtained in solution or in a water/water (W/W) emulsion, by the use of controlled and/or adjusted polymerization methods.

Table 1 below illustrates possible monomer combinations to be used in the polymers provided by present invention. By combining the different monomers, up to 35 different friction reducing additives can be obtained.

TABLE 1

Combinations of monomers for the polymers provided by the present invention

| N | AAm | AA | AMPSA | SPMP | DMAPS | METAC | APTAC | HEA | EHEA | LA | NAAAm | BIS | EDGA |
|---|---|---|---|---|---|---|---|---|---|---|---|---|---|
| 1 | X | X | | | | | | | | | | | |
| 2 | X | X | | | | | | | | | | X | |
| 3 | X | X | | | | | | | | | | | X |
| 4 | X | X | | | | | | X | | | | | |
| 5 | X | X | | | | | | X | | X | | | |
| 6 | X | X | | | | | | | X | | | | |
| 7 | X | X | | | | | | | X | X | | | |
| 8 | X | X | | | | | | | | X | | | |
| 9 | X | X | | | | | | | | X | | X | |
| 10 | X | X | | | | | | | | | X | X | |
| 11 | X | X | | | X | | | | | | | | |
| 12 | X | X | | | X | | | | | | | X | |
| 13 | X | X | | | X | | | | | | | | X |
| 14 | X | X | | | X | | | | | X | | | |
| 15 | X | X | | | X | | | | | X | | X | |
| 16 | X | | X | | | | | | | | | | |
| 17 | X | X | X | | | | | | | | | | |
| 18 | X | X | X | | | | | | | X | | | |
| 19 | X | X | X | | | | | | | | | X | |
| 20 | X | X | X | | | | | | | X | | X | |
| 21 | X | | | X | | | | | | | | | |
| 22 | X | X | | X | | | | | | | | | |
| 23 | X | X | | X | | | | | | X | | | |
| 24 | X | X | | X | | | | | | | | X | |
| 25 | X | X | | X | | | | | | X | | X | |
| 26 | X | | | | | X | | | | | | | |
| 27 | X | X | | | | X | | | | | | | |
| 28 | X | X | | | | X | | | | X | | | |
| 29 | X | X | | | | X | | | | | | X | |
| 30 | X | X | | | | X | | | | X | | X | |
| 31 | X | | | | | | X | | | | | | |
| 32 | X | X | | | | | X | | | | | | |
| 33 | X | X | | | | | X | | | X | | | |
| 34 | X | X | | | | | X | | | | | X | |
| 35 | X | X | | | | | X | | | X | | X | |

*AAm: Acrylamide;
AA: Acrylic acido;
AMPSA: 2-acrylamido-2-methyl-1-propanesulfonic acid;
SPMPS: 3-sulfopropyl methacrylate potassium salts;
DMAPS: [2-(methacryloyloxy)ethyl]dimethyl-(3-sulfopropyl)ammonium hydroxide;
METAC: 2-(methacryloyloxy)ethyl trimethyl-ammonium chloride;
APTAC: (3-acrylamidopropyl)trimethylammonium chloride;
HEA: hexyl acrylate;
EHEA: 2-ethylhexyl acrylate:
LA: lauryl acrylate;
NAAAm: N-alkyl acrylamides;
BIS: N,N'-methylenebisacrylamide;
EGDA: ethylene glycol diacrylate.

Preferred combinations of monomers for the polymers provided by the present invention include:

- Acrylamide, acrylic acid and N,N'-methylenebisacrylamide by solution polymerization at 30, 40 and 50° C. using iodine as polymerization control agent, potassium persulfates and/or ammonium persulfate, N,N,N',N'-tetramethylethylenediamine and/or metabisulfite salts and/or iron II.
- Acrylamide, acrylic acid and ethylene glycol diacrylate by solution polymerization at 50° C. using iodine as polymerization control agent, potassium persulfates and/or ammonium persulfate, N,N,N',N'-tetramethylethylenediamine and/or metabisulfite salts and/or iron II.
- Acrylamide, acrylic acid and lauryl acrylate by emulsion polymerization at 65° C. using iodine as polymerization control agent, potassium persulfates and/or ammonium persulfate, N,N,N',N'-tetramethylethylenediamine and/or metabisulfite salts and/or iron II.
- Acrylamide, acrylic acid, lauryl acrylate and N,N'-methylenebisacrylamide by emulsion polymerization at 65° C. using iodine as polymerization control agent, potassium persulfates and/or ammonium persulfate, N,N,N',N'-tetramethylethylenediamine and/or metabisulfite salts and/or iron II.
- Acrylamide, acrylic acid and hexyl acrylate by emulsion polymerization at 65° C. using iodine as polymerization control agent, potassium persulfates and/or ammonium persulfate, N,N,N',N'-tetramethylethylenediamine and/or metabisulfite salts and/or iron II.
- Acrylamide, acrylic acid, hexyl acrylate and N,N'-methylenebisacrylamide by emulsion polymerization at 65° C. using iodine as polymerization control agent, potassium persulfates and/or ammonium persulfate, N,N,N',N'-tetramethylethylenediamine and/or metabisulfite salts and/or iron II.
- Acrylamide, acrylic acid and 2-ethylhexyl acrylate by emulsion polymerization at 65° C. using iodine as polymerization control agent, potassium persulfates and/or ammonium persulfate, N,N,N',N'-tetramethylethylenediamine and/or metabisulfite salts and/or iron II.
- Acrylamide, acrylic acid, 2-ethylhexyl acrylate and N,N'-methylenebisacrylamide by emulsion polymerization at 65° C. using iodine as polymerization control agent, potassium persulfates and/or ammonium persulfate, N,N,N',N'-tetramethylethylenediamine and/or metabisulfite salts and/or iron II.
- Acrylamide, acrylic acid, N-alkyl acrylamides and N,N'-methylenebisacrylamide by emulsion polymerization at 65° C. using iodine as polymerization control agent, potassium persulfates and/or ammonium persulfate, N,N,N',N'-tetramethylethylenediamine and/or metabisulfite salts and/or iron II.
- Acrylamide, acrylic acid and [2-(methacryloyloxy) ethyl] dimethyl-(3-sulfopropyl) ammonium hydroxide by solution polymerization at 55° C. using iodine as polymerization control agent, potassium persulfates and/or ammonium persulfate, N,N,N',N'-tetramethylethylenediamine and/or metabisulfite salts and/or iron II.
- Acrylamide, acrylic acid, [2-(methacryloyloxy) ethyl] dimethyl-(3-sulfopropyl) ammonium hydroxide and N,N'-methylenebisacrylamide by solution polymerization at 55° C. using iodine as polymerization control agent, potassium persulfate, N,N,N',N'-tetramethylethylenediamine and/or metabisulfite salts and/or iron II.
- Acrylamide, acrylic acid, [2-(methacryloyloxy) ethyl] dimethyl-(3-sulfopropyl) ammonium hydroxide and ethylene glycol diacrylate by solution polymerization at 55° C. using iodine as polymerization control agent, potassium persulfates and/or ammonium persulfate, N,N,N',N'-tetramethylethylenediamine and/or metabisulfite salts and/or iron II.
- Acrylamide, acrylic acid, [2-(methacryloyloxy) ethyl] dimethyl-(3-sulfopropyl) ammonium hydroxide and lauryl acrylate by emulsion polymerization at 70° C. using iodine as polymerization control agent, potassium persulfates and/or ammonium persulfate, N,N,N',N'-tetramethylethylenediamine and/or metabisulfite salts and/or iron II.
- Acrylamide, acrylic acid, [2-(methacryloyloxy) ethyl] dimethyl-(3-sulfopropyl) ammonium hydroxide, lauryl acrylate and N,N'-methylenebisacrylamide by emulsion polymerization at 70° C. using iodine as polymerization control agent, potassium persulfates and/or ammonium persulfate, N,N,N',N'-tetramethylethylenediamine and/or metabisulfite salts and/or iron II.
- Acrylamide and 2-acrylamido-2-methyl-1-propanesulfonic acid by solution polymerization at 60° C. using iodine as polymerization control agent, potassium persulfates and/or ammonium persulfate, N,N,N',N'-tetramethylethylenediamine and/or metabisulfite salts and/or iron II.
- Acrylamide, acrylic acid and 2-acrylamido-2-methyl-1-propanesulfonic acid by solution polymerization at 60° C. using iodine as polymerization control agent, potassium persulfates and/or ammonium persulfate, N,N,N',N'-tetramethylethylenediamine and/or metabisulfite salts and/or iron II.
- Acrylamide, acrylic acid, 2-acrylamido-2-methyl-1-propanesulfonic acid and lauryl acrylate by emulsion polymerization at 70° C. using iodine as polymerization control agent, potassium persulfates and/or ammonium persulfate, N,N,N',N'-tetramethylethylenediamine and/or metabisulfite salts and/or iron II.
- Acrylamide, acrylic acid, 2-acrylamido-2-methyl-1-propanesulfonic acid and N,N'-methylenebisacrylamide by solution polymerization at 60° C. using iodine as polymerization control agent, potassium persulfates and/or ammonium persulfate, N,N,N',N'-tetramethylethylenediamine and/or metabisulfite salts and/or iron II.
- Acrylamide, acrylic acid, 2-acrylamido-2-methyl-1-propanesulfonic acid, lauryl acrylate and N,N'-methylenebisacrylamide by emulsion polymerization at 70° C. using iodine as polymerization control agent, potassium persulfates and/or ammonium persulfate, N,N,N',N'-tetramethylethylenediamine and/or metabisulfite salts and/or iron II.
- Acrylamide and 3-sulfopropyl methacrylate potassium salt by solution polymerization at 60° C. using iodine as polymerization control agent, potassium persulfates and/or ammonium persulfate, N,N,N',N'-tetramethylethylenediamine and/or metabisulfite salts and/or iron II.
- Acrylamide, acrylic acid and 3-sulfopropyl methacrylate potassium salt by solution polymerization at 60° C. using iodine as polymerization control agent, potassium persulfates and/or ammonium persulfate, N,N,N',N'-tetramethylethylenediamine and/or metabisulfite salts and/or iron II.

Acrylamide, acrylic acid, 3-sulfopropyl methacrylate potassium salt and lauryl acrylate by emulsion polymerization at 70° C. using iodine as polymerization control agent, potassium persulfates and/or ammonium persulfate, N,N,N',N'-tetramethylethylenediamine and/or metabisulfite salts and/or iron II.

Acrylamide, acrylic acid, 3-sulfopropyl methacrylate potassium salt and N,N'-methylenebisacrylamide by solution polymerization at 60° C. using iodine as polymerization control agent, potassium persulfates and/or ammonium persulfate, N,N,N',N'-tetramethylethylenediamine and/or metabisulfite salts and/or iron II.

Acrylamide, acrylic acid, 3-sulfopropyl methacrylate potassium salt, lauryl acrylate and N,N'-methylenebisacrylamide by emulsion polymerization at 70° C. using iodine as polymerization control agent, potassium persulfates and/or ammonium persulfate, N,N,N',N'-tetramethylethylenediamine and/or metabisulfite salts and/or iron II.

Acrylamide and 2-(methacryloyloxy)ethyl trimethyl-ammonium chloride by solution polymerization at 60° C. using iodine as polymerization control agent, potassium persulfates and/or ammonium persulfate, N,N,N',N'-tetramethylethylenediamine and/or metabisulfite salts and/or iron II.

Acrylamide, acrylic acid and 2-(methacryloyloxy)ethyl trimethyl-ammonium chloride by solution polymerization at 60° C. using iodine as polymerization control agent, potassium persulfates and/or ammonium persulfate, N,N,N',N'-tetramethylethylenediamine and/or metabisulfite salts and/or iron II.

Acrylamide, acrylic acid, 2-(methacryloyloxy)ethyl trimethyl-ammonium chloride and lauryl acrylate by emulsion polymerization at 70° C. using iodine as polymerization control agent, potassium persulfates and/or ammonium persulfate, N,N,N',N'-tetramethylethylenediamine and/or metabisulfite salts and/or iron II.

Acrylamide, acrylic acid, 2-(methacryloyloxy)ethyl trimethyl-ammonium chloride and N,N'-methylenebisacrylamide by solution polymerization at 60° C. using iodine as polymerization control agent, potassium persulfates and/or ammonium persulfate, N,N,N',N'-tetramethylethylenediamine and/or metabisulfite salts and/or iron II.

Acrylamide, acrylic acid, 2-(methacryloyloxy)ethyl trimethyl-ammonium chloride, lauryl acrylate and N,N'-methylenebisacrylamide by emulsion polymerization at 70° C. using iodine as polymerization control agent, potassium persulfates and/or ammonium persulfate, N,N,N',N'-tetramethylethylenediamine and/or metabisulfite salts and/or iron II.

Acrylamide and (3-acrylamidopropyl) trimethylammonium chloride by solution polymerization at 60° C. using iodine as polymerization control agent, potassium persulfates and/or ammonium persulfate, N,N,N',N'-tetramethylethylenediamine and/or metabisulfite salts and/or iron II.

Acrylamide, acrylic acid and (3-acrylamidopropyl) trimethylammonium chloride by solution polymerization at 60° C. using iodine as polymerization control agent, potassium persulfates and/or ammonium persulfate, N,N,N',N'-tetramethylethylenediamine and/or metabisulfite salts and/or iron II.

Acrylamide, acrylic acid, (3-acrylamidopropyl) trimethylammonium chloride and lauryl acrylate by emulsion polymerization at 70° C. using iodine as polymerization control agent, potassium persulfates and/or ammonium persulfate, N,N,N',N'-tetramethylethylenediamine and/or metabisulfite salts and/or iron II.

Acrylamide, acrylic acid, (3-acrylamidopropyl) trimethylammonium chloride and N,N'-methylenebisacrylamide by solution polymerization at 60° C. using iodine as polymerization control agent, potassium persulfates and/or ammonium persulfate, N,N,N',N'-tetramethylethylenediamine and/or metabisulfite salts and/or iron II.

Acrylamide, acrylic acid, (3-acrylamidopropyl) trimethylammonium chloride, lauryl acrylate and N,N'-methylenebisacrylamide by emulsion polymerization at 70° C. using iodine as polymerization control agent, potassium persulfates and/or ammonium persulfate, N,N,N',N'-tetramethylethylenediamine and/or metabisulfite salts and/or iron II.

The polymerization mechanism involves chain growth via free-radical reactions and can be carried out a temperature between 30° C. and 70° C., depending on the specific monomer combination, as detailed above.

The use of iodine as a polymerization control agent improves the properties of the obtained polymers, allowing increased polymer conversions without crosslinking, and providing polymers having an enhanced polydispersity index (PDI). Advantageously, the weight-average molecular weights of the polymers provided by the invention are between $1.7 \times 10^6$ and $3.1 \times 10^6$ g/mol and the PDIs of the polymers provided by the present invention are in the range from about 6 to about 19.

The incorporation of a catalyst comprising N,N,N',N'-tetramethylethylenediamine and/or metabisulfite salts and/or iron III salts improved the polymerization rates, allowing high polymer conversions without crosslinking, as well as an improved polydispersity.

The polydispersity indexes are controllable, and the structure-properties relationship is advantageous for their technological function. The polymers of the present invention show friction reducing properties and an enhanced resistance to saline media.

When used to prepare fracturing fluid compositions, the polymers provided by the invention are added to water, e.g. tap water, in a concentration between 150 to 1500 ppm, whereby apparent viscosities of about 1 to about 40 Pa·s are obtained, as measured by a rotational viscometer at 51 $s^{-1}$.

The general procedure for preparing the polymers provided by the invention preparation by aqueous solution polymerization is as follows: In a 1 L glass reactor, equipped with a mechanic stirrer and nitrogen and a heating jacket, a specific amount of a pH sensible monomer, i.e, an anionic monomer is added and NaOH/HCl is added to adjust pH value to 8. Secondly, AAm and other aqueous soluble monomers i.e., zwitterionic/cationic monomers and ligands, i.e. N,N'-methylenebisacrylamide or ethylene glycol diacrylate, are added. Deionized water is added to produce a concentration of 20 wt % of reactants. Mechanical stirring is kept all time and the reactor is put in a cold bath and purged with nitrogen. After 30 min, the temperature is quickly increased to the selected temperature, as mentioned above and initiator, catalyst and control agent are added to the reaction system. The solution is left with nitrogen and magnetic stirring at the selected temperature, as mentioned above during 6-24 h depending on the monomer composition of the reactant. After the first hour, the stirring generally is stopped due to the high viscosity of the system. A typical reactant composition is acrylamide: 50-70%, anionic monomers: 0-50%, cationic monomers: 0-35%, chemical ligands: 0-0.5%.

The general procedure for preparing the polymers provided by the invention preparation by water/water emulsion polymerization is as follows: In a 1 L glass reactor, equipped with mechanic stirrer and nitrogen, a specific amount of a pH sensible monomer is added and NaOH/HCl is added to adjust pH value to 8. Secondly, AAm and other aqueous soluble monomers, i.e. zwitterionic/cationic monomers and ligands, i.e. N,N'-methylenebisacrylamide or ethylene glycol diacrylate, are added. Deionized water is added to produce a concentration of 20 wt % of reactants. Mechanical stirring is maintained throughout the process and the reactor is immersed in a cold bath and purged with nitrogen during 30 min. Simultaneously, a solution of non-aqueous soluble ligands, i.e. lauryl acrylate, hexyl acrylate or 2-ethylhexyl acrylate, in a Polysorbate emulsifier is prepared and purged during 15 minutes After the purge the solution of non-aqueous soluble ligands is added to the glass, the purged is removed and the system kept under nitrogen and the temperature is quickly increased to selected temperature, as mentioned above and initiator, catalyst and control agent are added to the reaction system. The solution is left with nitrogen and magnetic stirring at the selected temperature, as mentioned above during 6-24 h depending on the monomer composition of the reactant. After the first hour, the stirring generally is stopped due to the high viscosity of the system. A typical reactant composition is acrylamide: 50-70%, anionic monomers: 0-50%, cationic monomers: 0-35%, chemical ligands: 0-0.5%, physical ligands: 0-20%.

The use of a control agent and catalysts in this invention allows to reach higher conversions and thus higher viscosities and drag reduction capabilities relative to polymer additives previously reported in the art for similar purposes.

The polymers were characterized using Hydrogen Nuclear Magnetic Resonance (H-NMR) to determine compositions and monomer conversions and Gel Permeation Chromatography (GPC).

Fracturing fluids were prepared in a laboratory from the polymers of Table 1, using different water salinities and polymer concentrations. Fracturing fluid viscosity was determined in an oilfield rotational viscometer, Ofite 900 at $51\ s^{-1}$. Fracturing fluid drag reduction was measured in a friction flow loop. Firstly, the water pressure drop across the loop was determined at a certain flowrate. Secondly, the polymeric friction reducing additive was added to the water and stirred. Third, the fracturing fluid pressure drop at same flowrate was measured. The percentage of drag reduction were calculated as $(1-DP/DP_0) \times 100$; where $DP_0$ represents the water pressure drop and DP represents the fracturing fluid pressure drop.

Table 2 shows 10 selected friction reducing polymers obtained in this invention, the reference numbers in Table 2 correspond to the polymers of Table 1. Residual acrylamide, molecular weight and PDI are listed. Additionally, the table shows viscosities and Maximum Drag Reduction of prepared fracturing fluid using tap water and Polymer concentration of 150 and 600 ppm.

TABLE 2

Residual acrylamide respect to initial monomers amount, molecular weight and PDI of 10 selected friction reducing polymers obtained in this invention. Viscosities and Maximum Drag Reduction of prepared fracturing fluid using tap water and Polymer concentration of 150 and 600 ppm.

| Polymer in Table 1 | Residual acrylamide (ppm) | $M_w \times 10^6$ (g/mol) | PDI | $\eta$ ($51\ s^{-1}$) at 600 ppm | DR Max at 150 ppm | DR Max at 600 ppm |
|---|---|---|---|---|---|---|
| 2 | 200 | 2.8 | 14 | 5.2 | 69 | 63 |
| 3 | 100 | 3.1 | 12 | 6.5 | 68 | 60 |
| 5 | 60 | 2.1 | 6 | 6.6 | 72 | 66 |
| 9 | 20 | 1.7 | 7 | 11 | 70 | 64 |
| 11 | 90 | 1.9 | 10 | 5.5 | 69 | 63 |
| 15 | 80 | 2.5 | 8 | 5.6 | 72 | 68 |
| 25 | 200 | 2.6 | 16 | 4.3 | 69 | 65 |
| 30 | 280 | 3.1 | 19 | 5.4 | 71 | 58 |
| 2* | 500 | 2.6 | 79 | 4.1 | 65 | 60 |
| 15* | 450 | 4.5 | 40 | 8.2 | 66 | 58 |

*Polymers 2 and 15 of table 1 prepared without iodine as polymerization control agent

The invention claimed is:

1. A friction reducer comprising a copolymer of:
   acrylamide,
   an anionic monomer,
   a zwitterionic monomer,
   a physical ligand or a chemical ligand, and
   wherein the acrylamide amounts to at least 50% (w/w) of a total monomer content and the zwitterionic monomer is [2-(methacryloyloxy) ethyl] dimethyl-(3-sulfopropyl) ammonium hydroxide.

2. The friction reducer of claim 1, wherein a residual acrylamide content is lower than 500 ppm.

3. The friction reducer of claim 1, wherein the anionic monomer is selected from acrylic acid, 2-acrylamido-2-methyl-1-propanesulfonic acid, and 3-sulfopropyl methacrylate potassium salts.

4. The friction reducer of claim 1, wherein the friction reducer comprises a physical ligand selected from hexyl acrylate, 2-ethylhexyl acrylate, lauryl acrylate and N-alkyl acrylamides.

5. The friction reducer of claim 1, wherein the friction reducer comprises a chemical ligand selected from N,N'-methylenebisacrylamide and ethylene glycol diacrylate.

6. The friction reducer of claim 1, wherein a weight average molecular weight ($M_w$) of the copolymer is between $1.7 \times 10^6$ and $3.1 \times 10^6$ g/mol and its polydispersity index (PDI) is between 6 and 19.

7. A method to prepare a friction reducer comprising:
   carrying out a controlled radical polymerization process of a monomer mixture of acrylamide, an anionic monomer, zwitterionic monomer [2-(methacryloyloxy) ethyl] dimethyl-(3-sulfopropyl) ammonium hydroxide, and a hydrophobic monomer, wherein the acrylamide amounts to at least 50% (w/w) of a total monomer content, at a temperature between 30° C. and 70° C. using iodine as polymerization control agent.

8. A method for reducing friction in a hydraulic fracturing operation comprising using a solution comprising water and the friction reducer of claim 1, wherein the friction reducer is present at a concentration between 150 and 1500 ppm.

* * * * *